(12) United States Patent
Chen

(10) Patent No.: US 6,742,429 B2
(45) Date of Patent: Jun. 1, 2004

(54) SEAMLESS TYPE FOLDABLE PRECISE CUTTING PAD

(76) Inventor: Chieh-Tang Chen, No. 6, Ming De Street, Hua Tan Hsiang, Chang Hua Hsien (TW)

( * ) Notice: Subject to any disclaimer, the term of this patent is extended or adjusted under 35 U.S.C. 154(b) by 0 days.

(21) Appl. No.: 10/059,971

(22) Filed: Jan. 30, 2002

(65) Prior Publication Data

US 2003/0140755 A1 Jul. 31, 2003

(51) Int. Cl.7 .............................. B26D 7/01; B32B 7/00
(52) U.S. Cl. ..................................... 83/451; 269/289 R
(58) Field of Search ............................. 269/289 R, 901; 83/451

(56) References Cited

U.S. PATENT DOCUMENTS

| | | | | | |
|---|---|---|---|---|---|
| 2,778,324 A | * | 1/1957 | Mattson | .............. | 269/289 R X |
| 2,823,460 A | * | 2/1958 | Weiler | ................ | 269/289 R X |
| 2,935,107 A | * | 5/1960 | Bertelsen et al. | .... | 269/289 R X |
| 4,192,494 A | * | 3/1980 | Mima | ..................... | 269/289 R |
| 4,850,579 A | * | 7/1989 | Fisher | ...................... | 83/451 X |
| 5,085,416 A | * | 2/1992 | Miyake et al. | .......... | 269/289 R |
| 5,386,978 A | * | 2/1995 | Ladwig | ................... | 269/289 R |
| 5,501,441 A | * | 3/1996 | Kegley | .................... | 269/289 R |
| 5,860,641 A | * | 1/1999 | Heath | ..................... | 269/289 R |
| 6,164,478 A | * | 12/2000 | Cant | .................. | 269/289 R X |
| 6,371,298 B1 | * | 4/2002 | Bowman | ............ | 269/289 R X |
| 6,460,841 B1 | * | 10/2002 | Durr | ..................... | 269/289 R |

* cited by examiner

Primary Examiner—Charles Goodman
(74) Attorney, Agent, or Firm—Charles E. Baxley

(57) ABSTRACT

A seamless type foldable precise cutting pad includes multiple cutting pad bodies, a shear-resistant fiber net, and a shear-resistant surface skin. The multiple cutting pad bodies are juxtaposed with each other, and each of the multiple cutting pad bodies is a plate having a predetermined thickness. The shear-resistant fiber net has a predetermined length, and is closely arranged and sintered on one side of each of the multiple cutting pad bodies. The shear-resistant fiber net is aligned with a predetermined cutting direction. the shear-resistant surface skin is sintered on the shear-resistant fiber net, and entirely covers the shear-resistant fiber net.

1 Claim, 5 Drawing Sheets

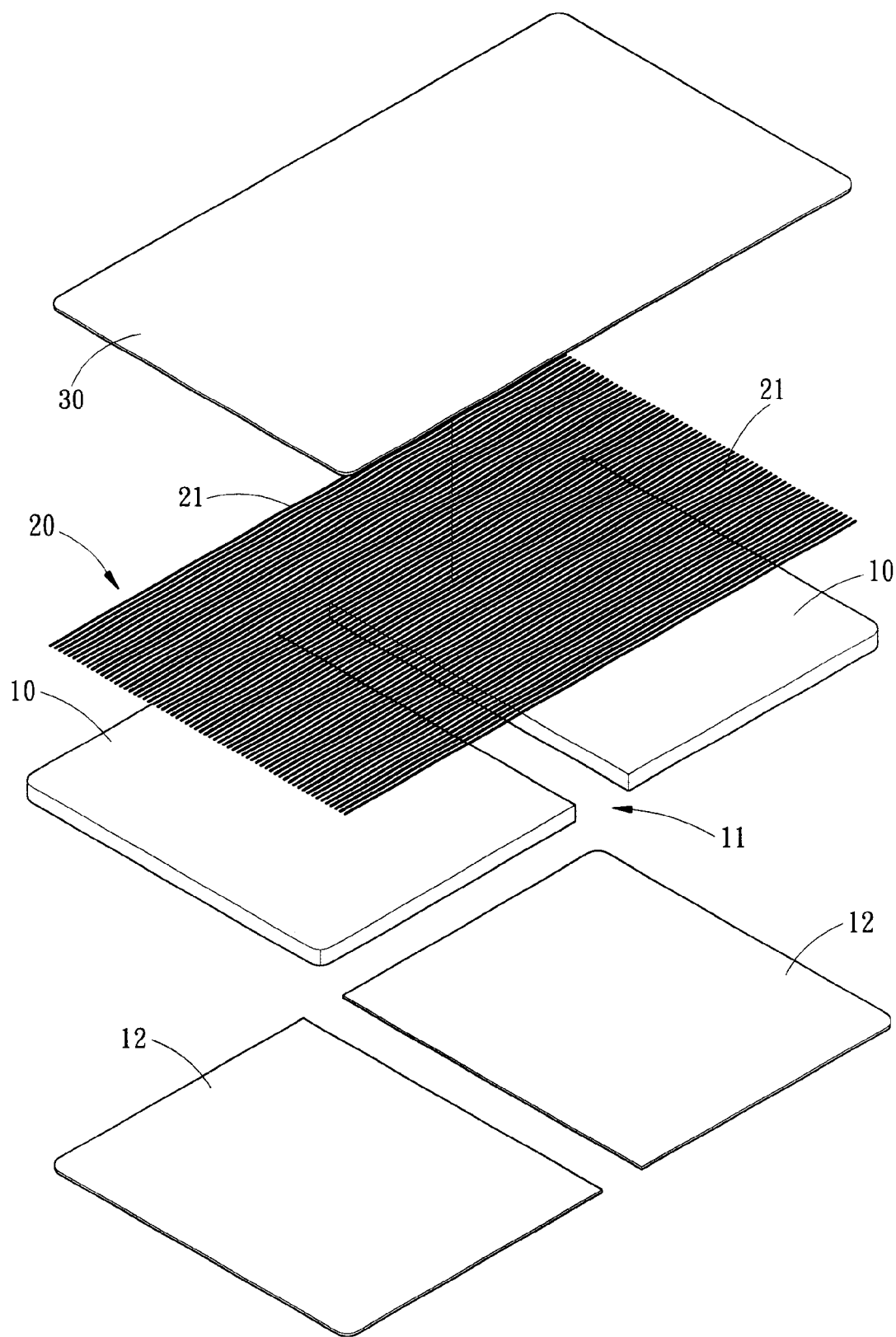
F I G. 1

SEAMLESS TYPE FOLDABLE PRECISE CUTTING PAD

BACKGROUND OF THE INVENTION

1. Field of the Invention

The present invention relates to a seamless type foldable precise cutting pad, and more particularly to a seamless type foldable precise cutting pad that may save the storage space, will not produce connecting seams that will affect the cutting effect, and may increase the cutting length.

2. Description of the Related Art

A conventional precise cutting pad in accordance with the prior art comprises a single-plated body, and a shear-resistant layer sintered on the surface of the body. Thus, a cutter may be used on the shear-resistant layer of the conventional precise cutting pad for cutting an article, such as paper or the like.

However, the conventional precise cutting pad has a determined length, so that it cannot be used to an article having a greater length, thereby greatly limiting the versatility of the conventional precise cutting pad. In addition, the body of the conventional precise cutting pad will be deformed permanently when it is bent or folded, so that the conventional precise cutting pad cannot be folded, thereby causing inconvenience to the user.

SUMMARY OF THE INVENTION

The present invention has arisen to mitigate and/or obviate the disadvantage of the conventional precise cutting pad.

The primary objective of the present invention is to provide a seamless type foldable precise cutting pad which comprises multiple cutting pad bodies sintered with an entire shear-resistant surface skin, and a shear-resistant fiber net is laminated between the multiple cutting pad bodies and the shear-resistant surface skin. Thus, the seamless type foldable precise cutting pad in accordance with a preferred embodiment of the present invention may be folded continuously, and has a cutting length that will not be limited.

Another objective of the present invention is to provide a seamless type foldable precise cutting pad which may save the storage space, will not produce connecting seams that will affect the cutting effect, and may increase the cutting length.

In accordance with the present invention, there is provided a seamless type foldable precise cutting pad, comprising:

multiple cutting pad bodies, juxtaposed with each other, each of the multiple cutting pad bodies being a plate having a predetermined thickness;

a shear-resistant fiber net, having a predetermined length, and closely arranged and sintered on one side of each of the multiple cutting pad bodies, the shear-resistant fiber net being aligned with a predetermined cutting direction; and a shear-resistant surface skin, sintered on the shear-resistant fiber net, and entirely covering the shear-resistant fiber net.

Preferably, the shear-resistant fiber net includes multiple shear-resistant fiber lines which are closely arranged and sintered on a peripheral side of a connection position of the multiple cutting pad bodies.

Preferably, the seamless type foldable precise cutting pad comprises three cutting pad bodies juxtaposed with each other.

Preferably, the cutting pad bodies may be made of materials that have different stiffness and are sintered many times.

Preferably, the seamless type foldable precise cutting pad further comprises multiple bottom layer cutting bodies made of an anti-skid material, wherein each of the multiple bottom layer cutting bodies is laminated on the bottom of one of the multiple cutting pad bodies.

Further benefits and advantages of the present invention will become apparent after a careful reading of the detailed description with appropriate reference to the accompanying drawings.

BRIEF DESCRIPTION OF THE DRAWINGS

FIG. 1 is an exploded perspective view of a seamless type foldable precise cutting pad in accordance with a preferred embodiment of the present invention;

DETAILED DESCRIPTION OF THE INVENTION

Figure 2:
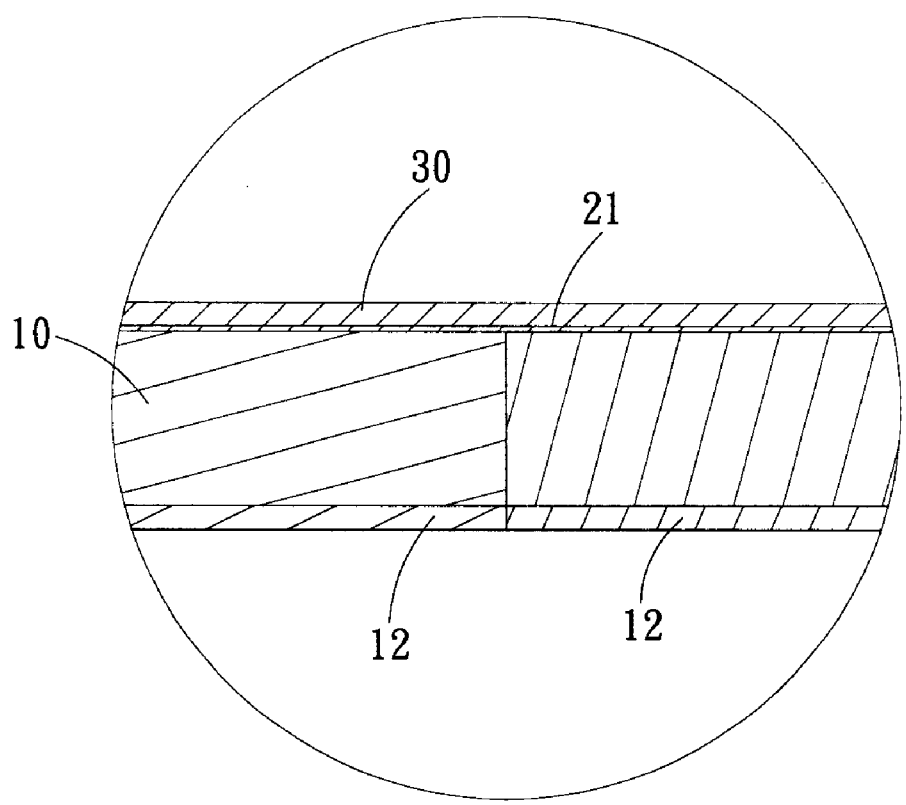
FIG. 2 is a front plan cross-sectional assembly view of the seamless type foldable precise cutting pad as shown in FIG. 1.
Figure 3:
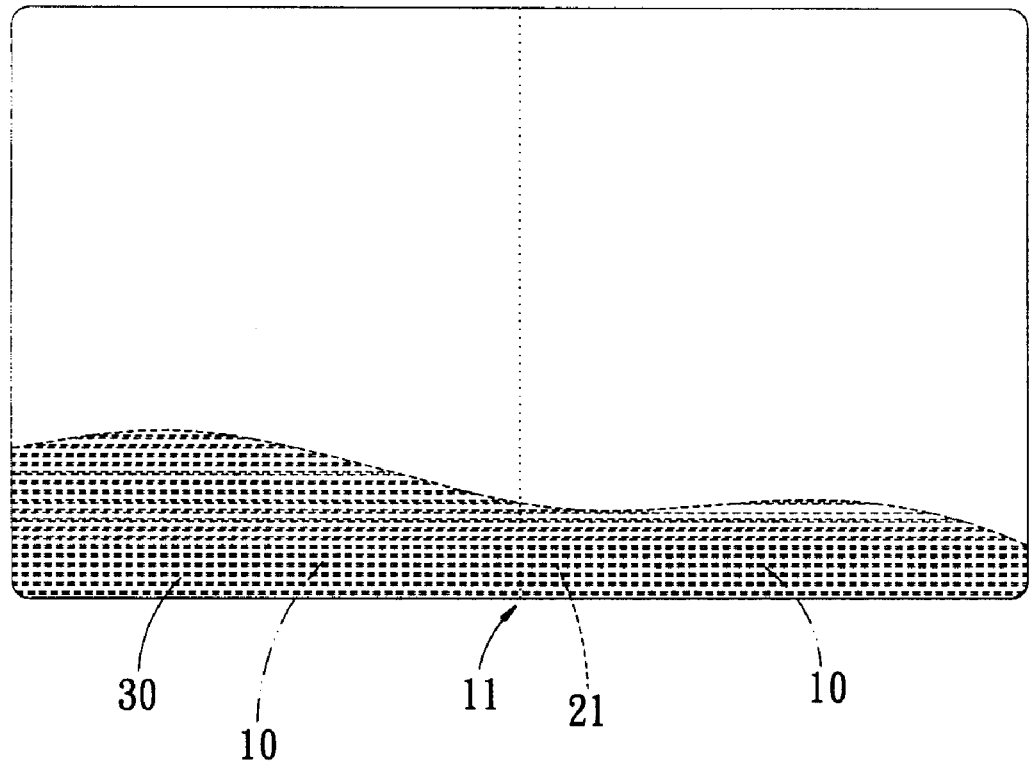
FIG. 3 is a front plan partially cross-sectional assembly view of the seamless type foldable precise cutting pad as shown in FIG. 1.

Referring to the drawings and initially to FIGS. 1–3, a seamless type foldable precise cutting pad in accordance with a preferred embodiment of the present invention comprises multiple cutting pad bodies 10 made from PVC, multiple bottom layer cutting bodies 12, a shear-resistant fiber net 20 made from high-strength nylon fiber having a predetermined length, and a shear-resistant surface skin 30 made from PVC having a predetermined length.

Each of the multiple cutting pad bodies 10 is a plate having a predetermined thickness, and has a shape mating with each other. The multiple cutting pad bodies 10 are juxtaposed with each other. A connecting seam 11 is defined between any two adjacent cutting pad bodies 10.

Each of the multiple bottom layer cutting bodies 12 is made of an anti-skid material, and is laminated on the bottom of one of the multiple cutting pad bodies 10.

The shear-resistant fiber net 20 having a predetermined length is sintered and covered on the top of each of the multiple cutting pad bodies 10, and consists of multiple shear-resistant fiber lines 21 which intersect with each other in a staggered manner along the longitudinal direction and along the transverse direction thereof as shown in FIG. 3. The multiple shear-resistant fiber lines 21 of the shear-resistant fiber net 20 are aligned with a predetermined cutting direction of the present invention.

The shear-resistant surface skin 30 having a predetermined length is a plate that is entirely sintered and covered on the shear-resistant fiber net 20.

Figure 4:
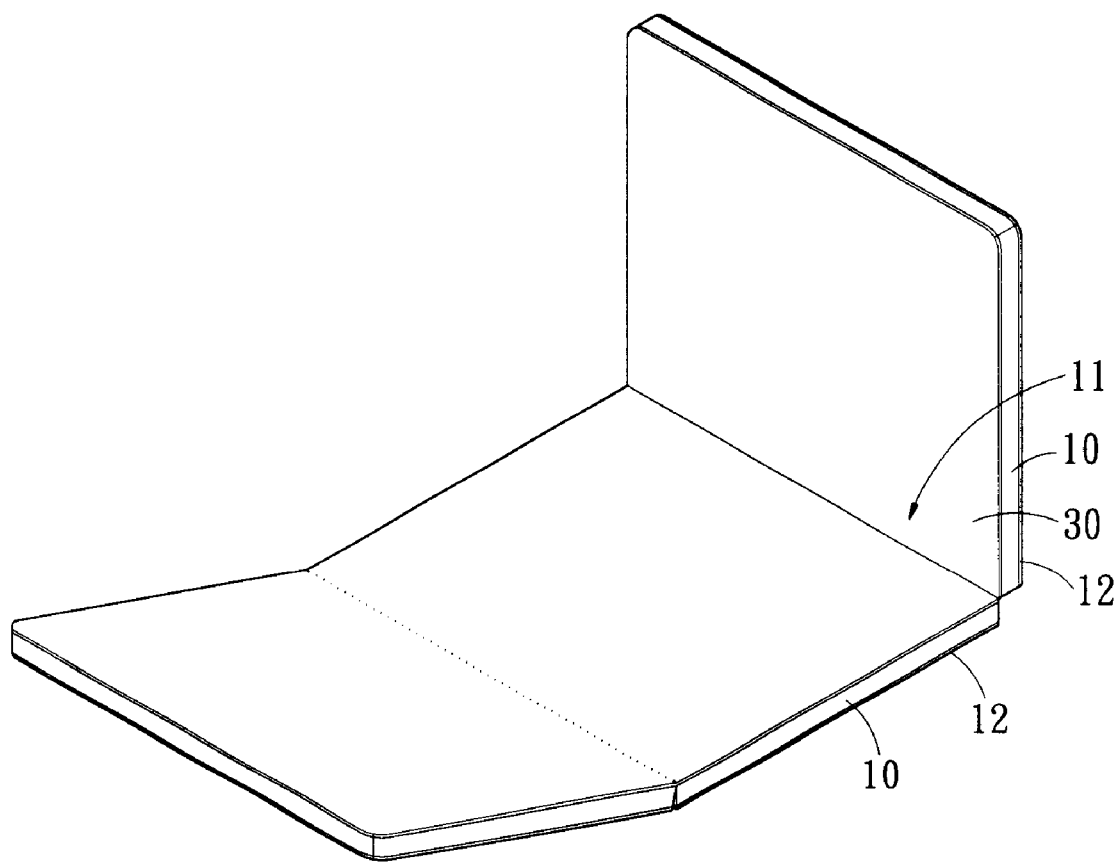
FIG. 4 is a perspective assembly view of a seamless type foldable precise cutting pad in accordance with another embodiment of the present invention.

In use, as shown in FIG. 4, the seamless type foldable precise cutting pad in accordance with a preferred embodiment of the present invention preferably comprises three cutting pad bodies 10, and three mating bottom layer cutting bodies 12 laminated on the three cutting pad bodies 10. The three cutting pad bodies 10 are located between the shear-resistant surface skin 30 and the three bottom layer cutting bodies 12. The three cutting pad bodies 10 are juxtaposed with each other.

The multiple shear-resistant fiber lines 21 of the shear-resistant fiber net 20 are closely arranged, and are sintered on the connecting seams 11 between the three cutting pad bodies 10. The shear-resistant surface skin 30 is entirely sintered and covered on the shear-resistant fiber net 20 in a heat melting and bonding manner.

Thus, by provision of the shear-resistant surface skin 30 and the multiple shear-resistant fiber lines 21 of the shear-resistant fiber net 20, the seamless type foldable precise cutting pad in accordance with a preferred embodiment of the present invention may be folded easily. In addition, the shear-resistant fiber net 20 includes a lot of shear-resistant fiber lines 21, so that the seamless type foldable precise cutting pad in accordance with a preferred embodiment of the present invention may have an excellent folding effect, and cannot be broken easily. Further, the seamless type foldable precise cutting pad in accordance with a preferred embodiment of the present invention may be folded many times by the connecting strength produced by the shear-resistant surface skin 30 and the multiple shear-resistant fiber lines 21 of the shear-resistant fiber net 20, so that the seamless type foldable precise cutting pad in accordance with a preferred embodiment of the present invention may save the storage space, will not produce connecting seams that may affect the cutting effect, and may increase the cutting length.

Figure 5:
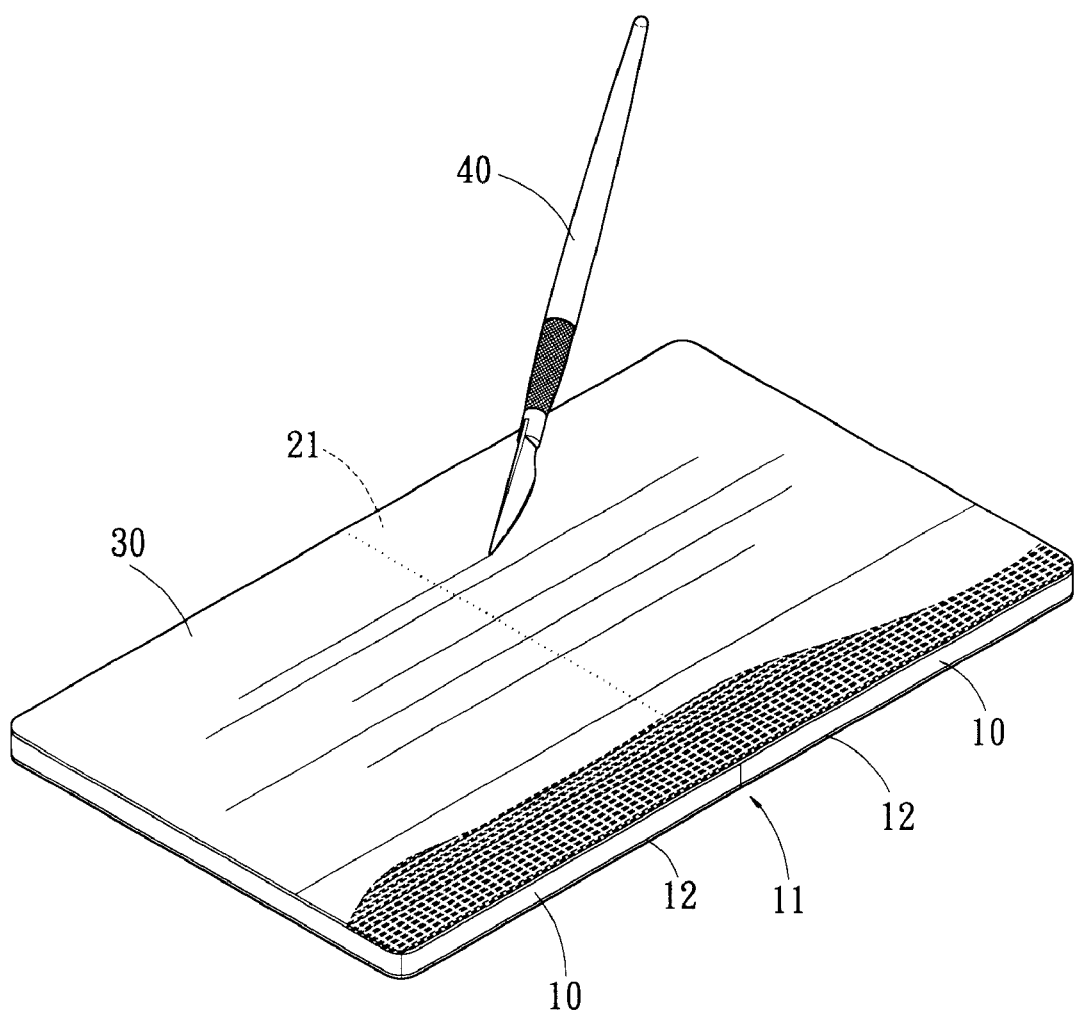
FIG. 5 is a schematic perspective view of a seamless type foldable precise cutting pad in accordance with a preferred embodiment of the present invention.

As shown in FIG. 5, when a cutter 40 is used on the seamless type foldable precise cutting pad in accordance with a preferred embodiment of the present invention to cut an article, the multiple shear-resistant fiber lines 21 of the shear-resistant fiber net 20 are closely arranged and sintered on the connecting seams 11 between the three cutting pad bodies 10, and the multiple shear-resistant fiber lines 21 of the shear-resistant fiber net 20 are aligned with the cutting direction of the cutter 40, so that the cutter 40 will not break the multiple shear-resistant fiber lines 21 of the shear-resistant fiber net 20. If the shear-resistant surface skin 30 is worn out during a long-term utilization, the multiple shear-resistant fiber lines 21 of the shear-resistant fiber net 20 still have a connecting effect, so that the seamless type foldable precise cutting pad in accordance with a preferred embodiment of the present invention may be folded and operated normally.

Accordingly, the seamless type foldable precise cutting pad in accordance with a preferred embodiment of the present invention comprises multiple cutting pad bodies sintered with an entire shear-resistant surface skin, and a shear-resistant fiber net is laminated between the multiple cutting pad bodies and the shear-resistant surface skin. Thus, the seamless type foldable precise cutting pad in accordance with a preferred embodiment of the present invention may be folded continuously, and has a cutting length that will not be limited.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A seamless type foldable precise cuffing pad, comprising:
    multiple cutting pad bodies made from PVC, juxtaposed with each other with a seam left between each of the cutting pad bodies, each of the multiple cutting pad bodies being a plate having a predetermined thickness;
    a shear-resistant fiber net made from high-strength nylon fiber being sintered on, having a predetermined length, and closely arranged and sintered on one side of each of the multiple cutting pad bodies and also cover the seam between each of the cutting pad bodies, such that the cutting pad bodies are connected in succession, and
    a shear-resistant surface skin made from PVC, sintered on the shear-resistant fiber net, and entirely covering the shear-resistant fiber net, plural bottom layer cutting bodies made of an anti-skid material, each of the multiple bottom layer cutting bodies is laminated on the bottom of each of the cutting pad bodies;
    wherein the cutting pad bodies can be folded up along the seam.

* * * * *